INVENTOR.
EUGEN BUHLER
BY Joe L. Koerber
ATTORNEY

Dec. 13, 1955 E. BUHLER 2,726,940

XEROGRAPHIC PRINTER

Filed Nov. 3, 1954 7 Sheets-Sheet 2

INVENTOR.
EUGEN BUHLER

BY Joe L. Koerber

ATTORNEY

Dec. 13, 1955 E. BUHLER 2,726,940

XEROGRAPHIC PRINTER

Filed Nov. 3, 1954 7 Sheets-Sheet 3

| ZONE | DIGIT | SYMBOL |
|---|---|---|
| 1 | 9 | ¤ |
| 1 | 8 | ¢ |
| 1 | 7 | % |
| 1 | 6 | @ |
| 1 | 5 | · |
| 1 | 4 | $ |
| 1 | 3 | , |
| 1 | 2 | # |
| 1 | 1 | 1 |
| 0 | 9 | Z |
| 0 | 8 | Y |
| 0 | 7 | X |
| 0 | 6 | W |
| 0 | 5 | V |
| 0 | 4 | U |
| 0 | 3 | T |
| 0 | 2 | S |
| 0 | 1 | / |
| 11 | 9 | R |
| 11 | 8 | Q |
| 11 | 7 | P |
| 11 | 6 | O |
| 11 | 5 | N |
| 11 | 4 | M |
| 11 | 3 | L |
| 11 | 2 | K |
| 11 | 1 | J |
| 12 | 9 | I |
| 12 | 8 | H |
| 12 | 7 | G |
| 12 | 6 | F |
| 12 | 5 | E |
| 12 | 4 | D |
| 12 | 3 | C |
| 12 | 2 | B |
| 12 | 1 | A |
| 11 | 0 | ( |
| 12 | 0 | ) |
| 12 | 11 | ÷ |
| | 9 | 9 |
| | 8 | 8 |
| | 7 | 7 |
| | 6 | 6 |
| | 5 | 5 |
| | 4 | 4 |
| | 3 | 3 |
| | 2 | 2 |
| | 1 | 1 |
| | 0 | 0 |
| | 11 | – |
| | 12 | & |

*INVENTOR.*
EUGEN BUHLER

*BY* Joe L. Koerber

ATTORNEY

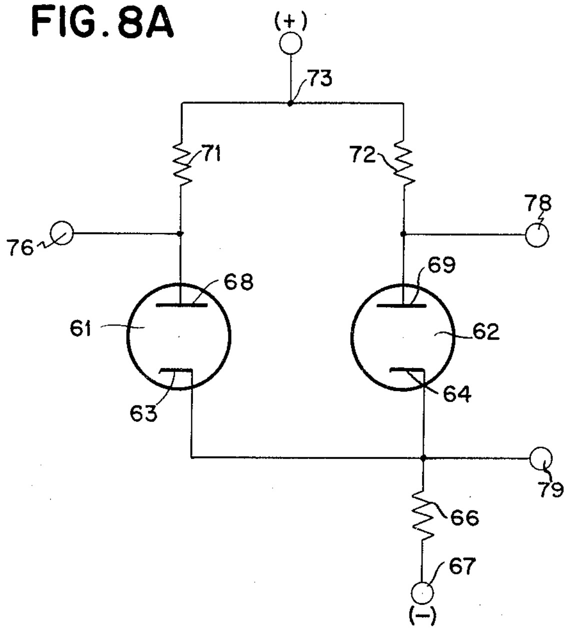
FIG. 8B
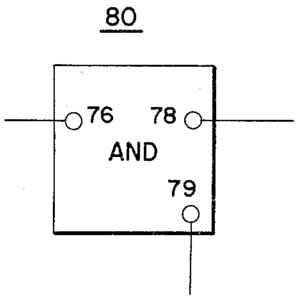
FIG. 9A
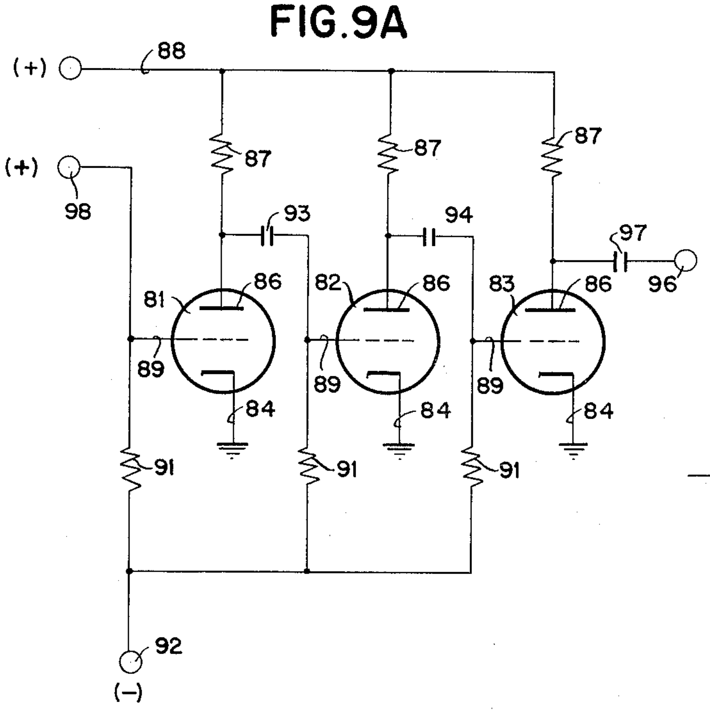
FIG. 9B
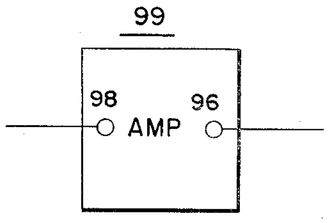
INVENTOR.
EUGEN BUHLER
BY Joe L. Koerber
ATTORNEY Dec. 13, 1955 E. BUHLER 2,726,940

XEROGRAPHIC PRINTER

Filed Nov. 3, 1954 7 Sheets-Sheet 5

INVENTOR.

EUGEN BUHLER

BY Joe L. Koerber

ATTORNEY

INVENTOR.
EUGEN BUHLER

BY

Joe L. Koerber

ATTORNEY

Dec. 13, 1955 E. BUHLER 2,726,940

XEROGRAPHIC PRINTER

Filed Nov. 3, 1954 7 Sheets-Sheet 7

United States Patent Office 2,726,940
Patented Dec. 13, 1955

2,726,940

XEROGRAPHIC PRINTER

Eugen Buhler, Poughkeepsie, N. Y., assignor to International Business Machines Corporation, New York, N. Y., a corporation of New York Application November 3, 1954, Serial No. 466,496

14 Claims. (Cl. 41—1)

This invention relates to a recorder and more particularly to a photo recorder.

Parallel printing photo recorders are not new but in the past have had definite shortcomings some of which are undesirable exposure of areas adjacent a print area, unusually large dimensions necessitated by a long focal length lens, and complex circuits requisite to selective printing.

One of the above shortcomings is overcome in this improved device by substituting a multiplicity of small, short focal length lenses for the usual large single lens. The short focal length permits a great reduction in machine size. The use of an individual lens for each print column also greatly reduces the exposure of the areas adjacent a print position when a character is exposed in that position. The circuit for effecting the triggering of individual arc units in timed relation to the passage of selected characters past appropriate print position is an improvement and simplification over presently used circuits.

In accordance with the invention conventional punched record cards are sensed synchronously with the rotation of a character drum and, as a particular coded indicia is sensed in the card, the corresponding character on the drum passes a print line. In response to the coincident sensing of the indicia and the reception of a timing pulse associated with that character, an arc unit is fired illuminating the selected character and projecting its image onto a light sensitive medium, after which it is recorded. A plurality of such units are mounted in parallel to provide simultaneous parallel printing of all similar characters in a given line.

Accordingly, one object of the invention is to provide a simple and compact parallel photo-printing machine.

Another object of this invention is to provide a simple and compact parallel photo printer capable of high speed printing which is responsive to data stored in cards, tapes, electronic computers or similar devices.

Still another object is to greatly reduce the dimensions previously found necessary to this type of printer.

Yet another object is to provide a parallel photo printer capable of producing a better quality copy than has heretofore been possible.

Another object is to provide an improved circuit for effecting parallel printing of selected characters.

A further object of this invention is to provide a simple circuit for selective suppression of zeros to the left of a first significant digit.

Still another object is to provide pluggable numeric selection for every column but to provide alphabetic selecting units for a lesser number of columns, each of said units being pluggable to any desired column.

An additional object is to provide a simple and compact photo recording machine which will instantly furnish a finished positive copy.

Yet another object is to provide a recorder having constantly moving print elements adapted for non-contact printing.

Other objects of the invention will be pointed out in the following description and claims and illustrated in the accompanying drawings, which disclose, by way of example, the principle of the invention and the best mode which has been contemplated of applying that principle.

In the drawings:

Figs. 8A and 8B are showings of a circuit component and the block representations thereof.

Figs. 9A and 9B are showings of another circuit component and the block representations thereof.

In accordance with this invention any number of print columns may be provided, but, for the purpose of illustration, it will be assumed that the machine comprises eighty print columns each of which is adapted for numeric printing and thirty of which are adapted for alphabetic and numeric printing. It will be understood that alphabetic printing may be provided for all columns but, in many applications, the majority of the printing is numeric with alphabetic printing confined to a limited number of selected columns. Therefore by providing a smaller number of pluggable alphabetic units, unnecessary duplication of parts may be eliminated.

*General description*

Figures 1, 2:
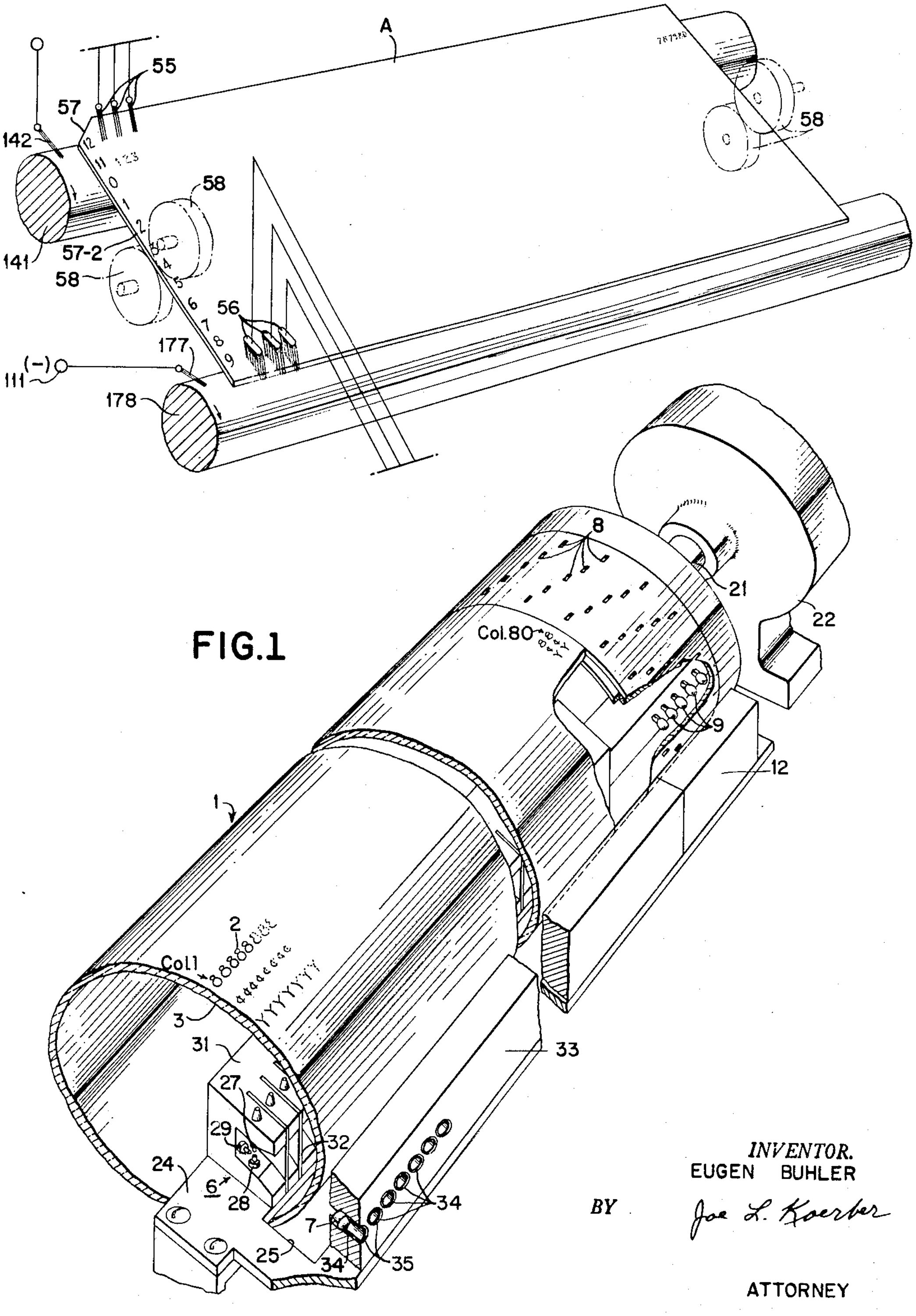
Fig. 1 is a schematic showing of a drum bearing transparent characters and zoning slots, individual sparking units, individual lenses, lights, and a photo cell holder for holding photocells which cooperate with said zoning slots and lights.
Fig. 2 is a schematic showing of a card sensing device having two sets of sensing brushes, one for zoning and one for printing.

A constantly rotated drum 1, as shown in Fig. 1, is provided having transparent characters 2 on an opaque background 3. To facilitate illustration the background in the figures is light and the characters are dark, but it will be understood that the characters are the transparent part. An individual column of characters 2 is associated with each of the eighty print positions. A plurality of arc units 6 are mounted inside the drum 1 and are aligned one arc unit behind each column of characters 2. Adjacent the drum 1 and in alignment with the arc units 6 and corresponding columns of characters 2 are individual focusing lenses 7.

A plurality of zoning slots 8 are arranged in five columns on one end of the drum 1 and cooperate with five lights 9 that are mounted inside the drum and five photocells 11 which are mounted outside the drum in a holder 12. The elements 8, 9 and 11 cooperate to emit timed pulses which are adapted by suitable circuits to cooperate with other timed pulses derived from the sensing of punched cards A, Fig. 2, to effect the selective triggering of individual arc units 6 as selected characters 2 pass between the arc units 6 and the corresponding focusing lenses 7.

Figure 3:
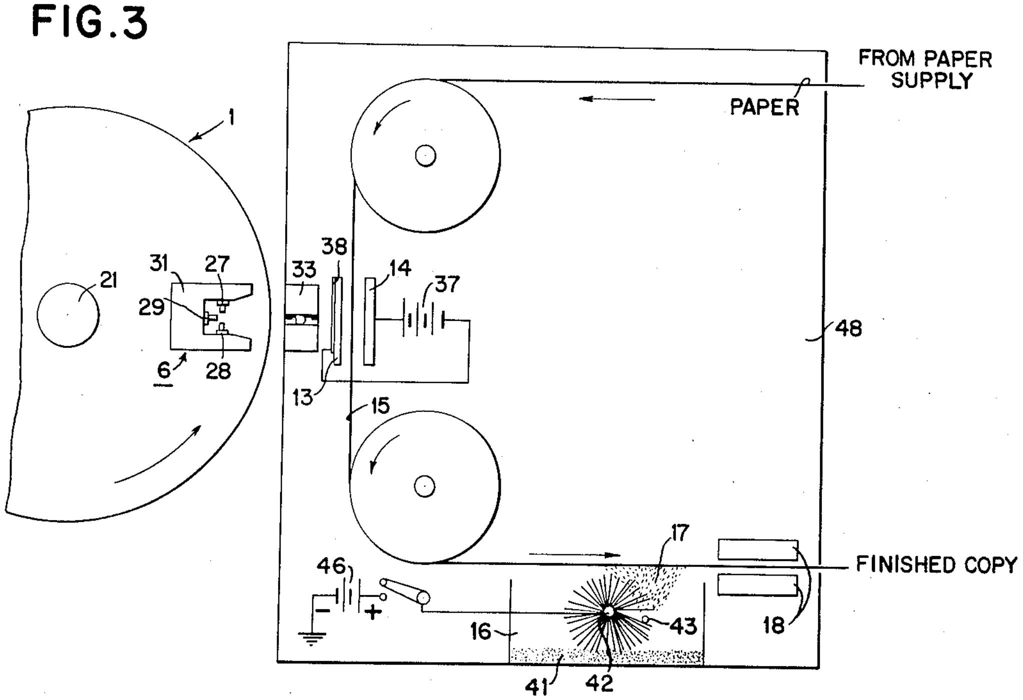
Fig. 3 is a schematic showing of the device including the character drum, sparking units, lenses, printing paper supply, character forming means, character developing means and character fixing means.

A plate 13 of photo emissive material, shown in Fig. 3, is positioned at a distance from the lenses 7 equal to twice the lens focal length. Upon exposure to light, the plate 13 emits electrons. When an area of the plate 13 in the shape of a character is exposed to light, the exposed area emits a cloud of electrons which is attracted toward a high potential plate 14 positioned behind the photo emissive plate. A non-conducting sheet of paper or similar material 15 is interposed between the photo emissive plate 13 and the high potential plate 14 and, as the electrons are drawn in parallel lines toward the high potential plate 14, they are deposited as a latent image of the exposed character on the non-conducting sheet 15. The sheet is passed through a powdering chamber 16 where positively charged powder particles 17 are attracted to the negatively charged area of the sheet 15, thereby developing the latent images. The sheet 15 bearing the developed images is passed through a heater unit 18 which fuses the powder image to the sheet 15. The sheet 15 emerges from the heater unit as a finished positive copy.

*Character drum*

Figure 4:
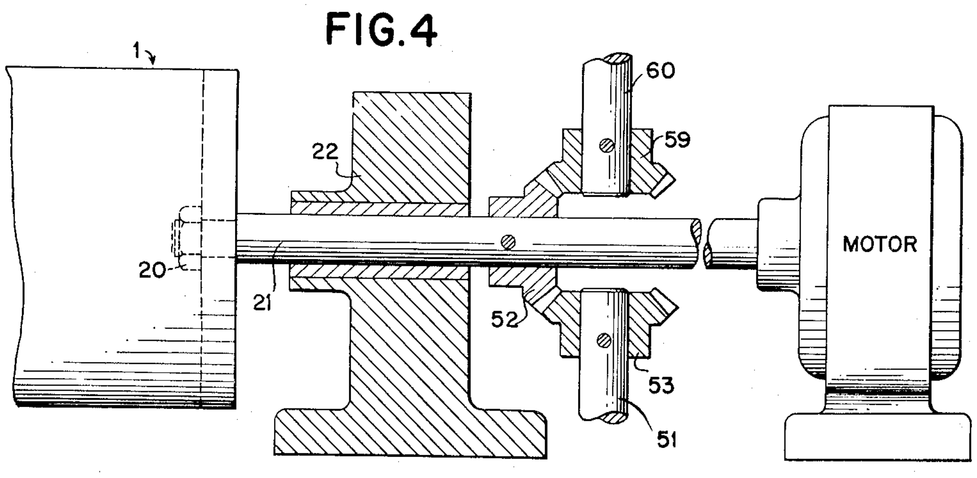
Fig. 4 is a showing of the drive mechanism for the character drum, the card feed, and the paper feed.
Figures 6, 7:
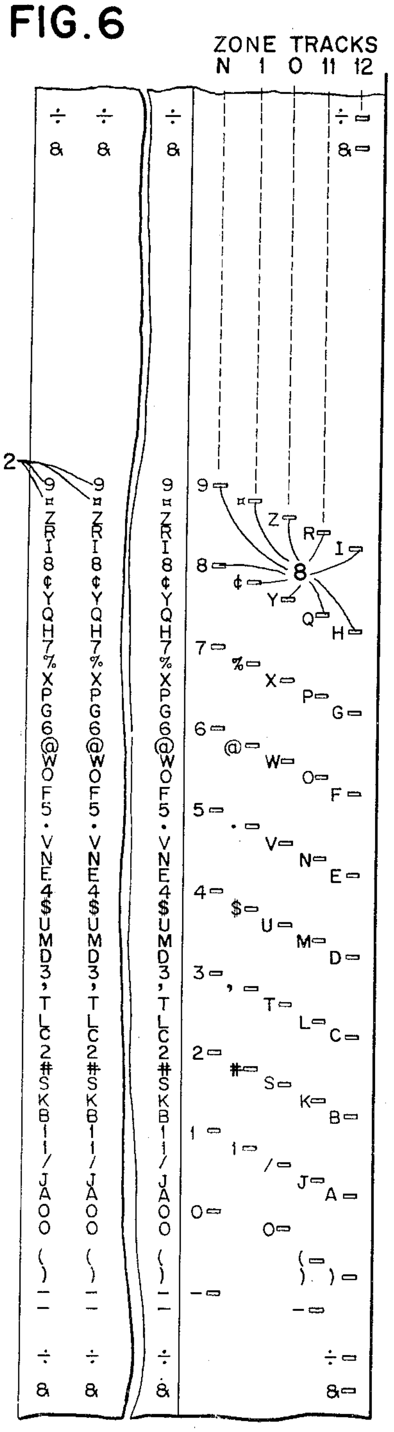
Fig. 6 is a developed section of the character drum illustrating the sequence of characters and their alignment with associated zoning slots.
Fig. 7 is an illustration of the character code.

Referring to Figs. 1 and 4, the drum 1 is mounted at one end, for example, by a clamping nut 20, on a motor driven shaft 21 that is suitably supported in a bearing 22. The drum 1 may be constructed of any suitable transparent material such as glass or Lucite. Photo composed on the inside of the drum are eighty circumferentially disposed columns of characters 2, each column consisting of two complete sets of alphabetic, numeric and special characters. The two sets of characters are separated at their ends by spaces equal to the space occupied by 20 characters 2 as indicated in Fig. 6. The purpose of this spacing will be explained hereinafter. The eighty columns of characters are identical and are similarly disposed to provide rows of eighty identical characters extending lengthwise on the drum. The characters 2 are right side up and frontwards as shown in Figs. 1 and 6, and are transparent whereas the surrounding areas are opaque as previously described. The projected images are reversed and inverted by the lenses and therefore appear in the proper position on the finished document that passes through the machine top edge first. The character columns on the drum, as seen in Fig. 1 correspond, from front to rear, to line print positions, 1 through 80, looking from front to rear. Referring to Fig. 7, it will be noted that each character, other than numeric, is represented by a two hole code designation; a zone hole plus a digit hole. For example the code for the letter Z comprises a zero punch and a nine punch. The numerals are designated by the usual digit holes.

*Arc units*

Still referring to Fig. 1, eighty of the arc units 6 are mounted on a bracket 24 which is suitably supported on the machine framework and contains a slot 25 that is adapted to receive the drum 1. One arc unit 6 is associated with each of the 80 columns of characters 2. Each arc unit 6 comprises a plurality of electrodes 27, 28 and 29 that are suitably supported in a base member 31, also shown in Fig. 3. The electrodes 27 and 28 are arcing electrodes and electrode 29 is a triggering electrode that is used to alter the breakdown characteristic of the gap between electrodes 27 and 28 to initiate arcing. Opaque barrier members 32 are interposed between adjacent arc units and serve the dual purpose of preventing any possible tendency of the discharge of one arc to cause the discharge of an adjacent arc, and of preventing the illumination produced by one arc from falling upon a character 2 associated with an adjacent arc unit. The arc unit will be further described in the circuit description. Reference may be had to the United States Patent No. 2,714,841, issued August 9, 1955, for a detail disclosure of the arc unit.

*Lens assembly*

Figure 5:
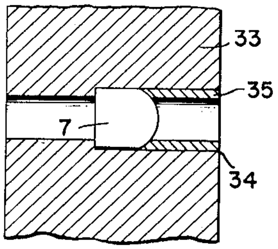
Fig. 5 is a detail showing of one of the lenses and the method of mounting.

The bracket 24 that supports the arc units also supports a lens holder 33 which is mounted outside the drum 1 and parallel to the eighty arc units 6. The lens holder has eighty holes 34 drilled therethrough and countersunk as shown in Fig. 5. The arc units 6, the columns of characters 2 and the holes 34 are so spaced and aligned that each column of characters will pass between a given arc unit 6 and an associated hole 34, and the light from each arc unit will pass through an aligned character and then axially through the associated hole 34. One of the lenses 7 is positioned in each counter sunk hole 34 and is held therein by a force fit sleeve 35. Each lens 7 is plano-convex and has a focal length of 6.4 mm. and a lens opening of f:5.5. The convex surface of each lens 7 is positioned a distance equal to twice the focal length of the lens or 12.8 mm., from the plane of the drum characters.

*Latent image forming and developing*

The photo emissive plate 13, as shown in Fig. 3, is positioned adjacent the lens holder 33, on the opposite side from the character drum 1 and at a distance equal to twice the focal length of the lenses 7. The plate 13 is of photo-emissive material, for example, one of the Lenard phosphors. It is supported in an insulated manner, and extends parallel to the lens holder 33, and is of sufficient size to receive a complete row of eighty full size character images. When a light image of a character 2 is projected onto the plate 13 through a lens 7 by the firing of an arc unit 6, a cloud of electrons in the shape of the projected character is emitted from the plate 13 and is attracted toward the high potential plate 14, which runs parallel to and is the same size as the plate 13. The plate 14 is maintained at a high potential, for example, by a battery 37 that is connected to the plate 13 through a fine mesh screen 38 overlaying the plate 13. Interposed between the plate 13 and the plate 14 is the sheet 15 of non-conducting paper or similar material. The cloud of electrons being drawn toward the plate 14 is deposited on the sheet 15 thereby forming a latent image of the exposed character 2.

After a full line of latent images has been formed, the sheet 15 is moved through the powder chamber 16 containing a supply of powder 41 and an agitating brush 42 that acts with a stationary bar 43 to form the cloud of powder particles 17. The powder particles 17 are attracted to the latent character images on the sheet 15 and adhere thereto thus developing the latent images. Deposition of the particles 17 may be facilitated, if desired, by making the brush 42 of conducting material and connecting the brush to the positive terminal of a high voltage battery 46 (Fig. 3) to impart a positive charge to the powder particles.

After the latent image is so developed, the sheet 15 bearing the developed image is passed through the heater 18 where the powder is fused to the sheet 15.

The sheet 15 leaves the heater 18 as a positive and permanent finished copy. The lenses 7, the plates 13 and 14, the sheet 15 and the powdering and heating apparatus are all enclosed in a light proof case 48.

Reference may be had to the U. S. Patent 2,221,776, issued to C. F. Carlson, November 19, 1940, for a full disclosure of the photo-emissive, latent image forming and developing devices referred to herein.

The particular means for moving the paper 15 do not constitute a part of the present invention and may be of any suitable type, for example a Geneva movement that is operated from a shaft 51 that is geared to the driven shaft 21, Fig. 4, through a pair of bevel gears 52 and 53. Such means, geared to the shaft 21, are necessary to allow the sheet 15 to remain stationary for three fourths of a card cycle while one complete set of characters 2 passes the arc units 6 and then to provide rapid movement of the sheet 15 to the next print line during the remaining quarter cycle, while the previously mentioned space between sets of characters passes the arc units. Also, as the line spacing is taking place, the next card A is fed past a set of zoning brushes 55, shown in Fig. 2, thereby effecting a zoning operation, and on to a set of read brushes 56. As the line spacing is completed, the first characters of the next following set of characters on the constantly rotating drum arrive at the arc units 6, and the "9" position of the zoned card A arrives at the reading brushes 56.

*Timing tracks*

The eighty columns of characters 2, it will be noted, commence at one end of the drum 1, as shown in Fig. 1, but stop short of the other end. At the latter end are the five columns of slots 8 which are photo composed on this section of the drum forming transparent slots on an opaque background. The slots 8 are shown in greater detail in Fig. 6, where each slot is labelled according to the character represented thereby. It will be noted that each slot is aligned laterally with a corresponding row of characters 2.

Figure 10:
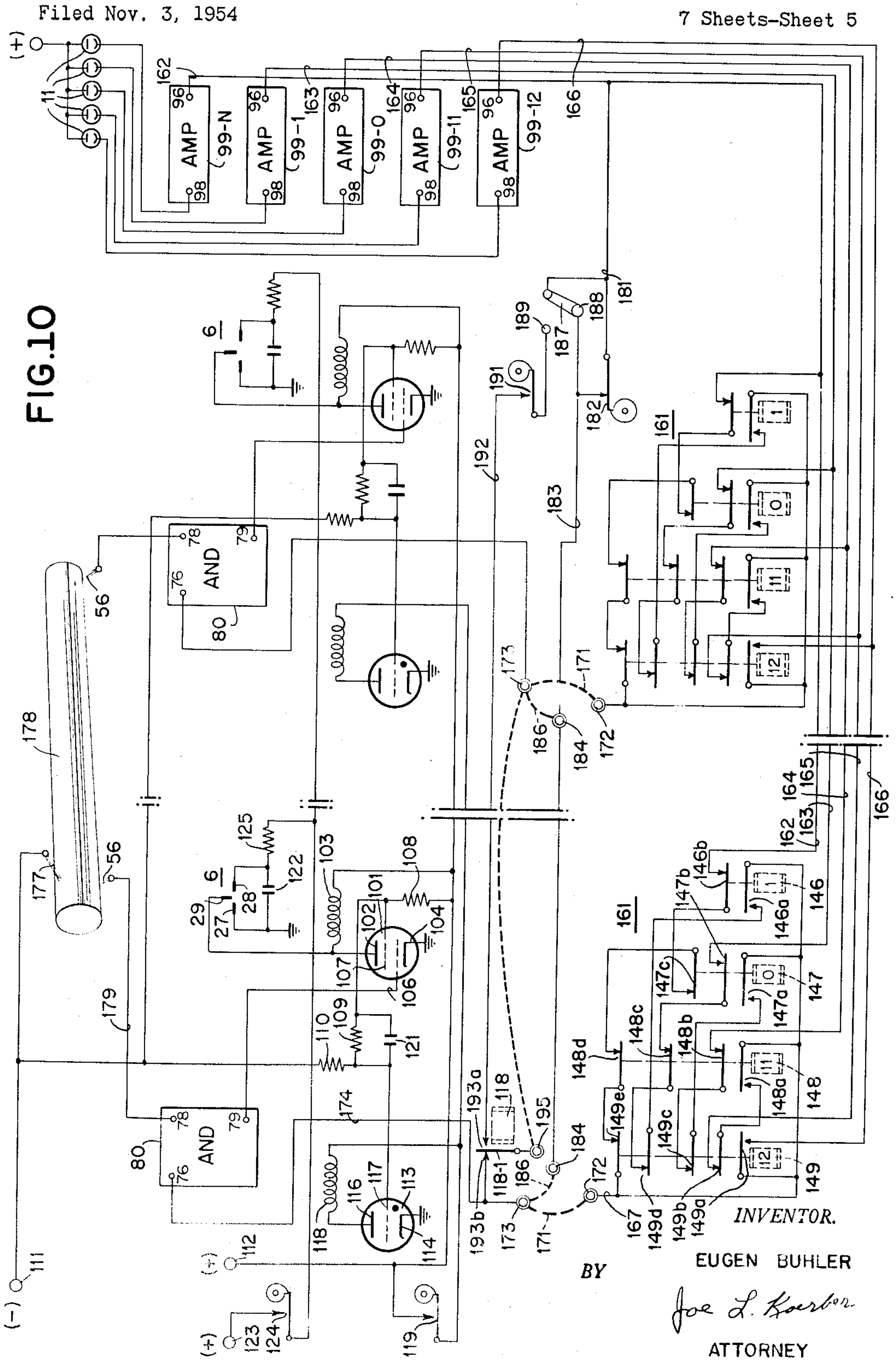
Fig. 10 is a schematic showing of circuitry including relays operated by the zoning circuits of Fig. 11 and partially showing the zero suppression circuit of Fig. 12.

The five lights 9 are mounted on the bracket 24 inside the drum 1 and behind the five columns of slots 8 and are constantly illuminated. The photocell holder 12 is mounted on the bracket 24 outside the drum 1 and abuts the lens holder 33. The five photo-conductive cells 11, shown in Fig. 10, are aligned with corresponding ones of the lights 9 and the associated columns of slots 8. It will be noted that a given character 2 and the corresponding slot 8 pass the arc units 6, and the photo-conductive cells 11 respectively at the same instant. The purpose of the slots 8, the lights 9 and the photo-conductive cells 11 will be explained in the circuit description.

*Cards and card read stations*

The cards A used in this preferred embodiment are conventional cards having twelve punch positions or cycle points numbered 9 through 12 as shown at 57 in Fig. 2 and having eighty punch columns numbered 1 through 80 from left to right. The cards are fed serially, 9-edge first, past the two sets of brushes 55 and 56, each set containing 80 brushes adapted for parallel sensing of all 80 columns. The card feeding means are conventional and are represented by two pair of feed rolls 58. The card feed mechanism drive shaft 60 may be geared to the motor shaft 21 as shown in Fig. 4, through the bevel gear 52 and a bevel gear 59 having a 2 to 1 ratio such such that two cards A are fed past the brushes 55 and 56 for each complete revolution of the drum 1, and five rows of characters 2 and corresponding timing track slots 8 pass an index line while one punch position or cycle point of the card passes the line of sensing brushes 56. The necessity of feeding two cards for one revolution of the drum is due to the placing of two complete sets of characters on the character drum. The ratio of five slots to one card cycle point is due to the fact that a single punched hole in a card cooperates selectively with five consecutively sensed timing slots 8 in a manner to be fully described in the circuit description.

The zoning brushes 55 are conventional brushes that sense the holes momentarily as they pass and the duration of the contact is not critical. In the case of the reading brushes 56, however, due to the fact that a hole must be sensed for the duration of the sensing of five timing slots 8 on the drum, and the further fact that a hole in the card covers only one half of a cycle point, the sensing of a hole must be prolonged in some manner for nearly the full cycle point. Such prolongation is achieved through the use of elongated reading brushes 56 whereby the initial contact is made through a punched hole by the leading edge of a brush and final contact is made through the trailing edge of the brush, the total contact thereby being prolonged for nearly a whole cycle point.

As a card A is fed, it first passes the brushes 55 effecting zoning which will be described in the circuit description. As the card is fed further, it encounters the reading brushes 56 where the sensing of a hole conditions associated arc triggering circuits.

This machine operates on a 16 point cycle and the feeding and spacing of successive cards is such that a second card is fed under the zoning brushes 55 and up to the position 57–2 of the card by the time the preceding card is emerging from the reading brushes 56. The positions 57–9 through 57–12 of the first card are sensed by the brushes 56 while a complete set of the slots 8 passes the lights 9 and photocells 11 in the same order.

As previously stated, each character other than numeric is represented by a two-hole code designation, a zone hole plus a digit hole. Numerals are designated by the usual digits. Exceptions to these rules are in the case of the characters "1" and "0" and "–". In these instances the single hole representing the character happens also to be a zone hole and in all columns provided with zoning units for alphabetic printing, the characters "1", "0" and "–" must be selected from the respective zone tracks 1, 0 and 11 as shown in Fig. 6. In columns not provided with zoning units, the sensing of the holes "1", "0" and "11" by the zoning brushes will have no effect and the printing of the "1," "0" and "–" will be effected through the N zone in the same manner as all other digits. To provide for the above exceptions, it will be noted, in Fig. 6 that, at one point, two consecutive rows of characters comprise "1's," at another point two consecutive rows of characters comprise "0's," and at a third point two consecutive rows of characters comprise "–'s". A single 12 punch represents the special character "&" and is used only with alphabetic printing. It is always zoned as are the zone holes 1, 0, and 11 in alphabetic printing.

*Circuit description*

In the circuit diagram some components are replaced by block representations which will first be explained in detail so that later reference may be made merely to the block representations.

*And circuit*

The "AND" circuit derives its name from the fact that a first input AND and a second input cooperate to give the desired output whereas, either of the pulses alone is ineffective.

The actual circuit is shown in Fig. 8A, and the block representation in Fig. 8B. Two diodes 61 and 62 have their cathodes 63 and 64 tied through a common resistor 66 to a negative supply terminal 67. Each of the tube plates 68 and 69 are connected through separate plate resistors 71 and 72 to a common point 73 which is tied to a positive potential supply. A terminal 76 is connected to a point between the plate 68 and the resistor 71 of the tube 61. A terminal 78 is connected to a point between the plate 69 and the resistor 72 of the tube 62. Under normal conditions, the positive potential at 73 and the negative potential at 67 are effective to cause both tubes 61 and 62 to conduct, thereby holding a common terminal 79, that is tied between the cathodes 63 and 64 and the resistor 66, at a potential above that maintained at the point 67 by an amount equal to the drop across the resistor 66. A negative input to the terminal 76 of sufficient magnitude to drop the plate 68 below the negative potential at 67 will cause the tube 61 to stop conducting thereby reducing the current through the resistor 66 and lowering the potential of the point 79. A negative input to the terminal 78 will similarly cause the tube 62 to stop conducting. With both the tubes 61 and 62 non-conducting, there is no current flowing in the resistor 66 and the potential at the point 79 is the same as the point 67.

Referring now to the block representation in Fig. 8B, only the input terminals 76 and 78 and the output terminal 79 are shown. Referring to Fig. 10 only the block representation is shown and is marked "AND" and is generally designated 80.

*Amplifier*

Referring to Figs. 9A and 9B, an amplifier and the block representation thereof are shown.

Three tubes 81, 82 and 83 having their cathodes 84 grounded and their plates 86 connected through plate resistors 87 to a common positive potential line 88 form a three stage amplifier. The grid 89 of each tube is connected through a resistor 91 to a negative supply terminal 92. The grid of the tube 82 is coupled to the plate of the tube 81 by a capacitor 93. The grid of the tube 83 is coupled to the plate of the tube 82 by a capacitor 94. A terminal 96 is coupled to the plate of the tube 83 by a capacitor 97. The tube voltages are so controlled that tubes 81 and 83 are normally non-conducting and the tube 82 is normally conducting. A positive input pulse at a terminal 98 raises the grid potential of the tube 81 causing the latter to conduct. The resultant negative pulse through the capacitor 93 lowers the grid potential of the tube 82 causing it to cease conducting. The resultant positive pulse through the capacitor 94 raises the grid potential of the tube 83 causing the tube 83 to conduct. The resultant negative pulse through the capacitor 97 enters the terminal 96. In the block representation only the input terminal 98 and the output terminal 96 are shown. The block representation is shown in Fig. 10 where it is labelled "AMP" and generally designated 99.

*Arcing circuit*

Referring to Fig. 10, a pentode 101 has its plate 102 connected through a high inductive coil 103 to a positive potential terminal 112, its cathode 104 is grounded, its control grid 106 is connected to the terminal 79 of an AND circuit 80, its screen grid 107 is connected between a resistor 108 and a resistor 109. The resistor 109 is connected through a resistor 110 to a negative potential supply 111. The resistor 108 is connected to the positive potential terminal 112. A thyratron 113 has its cathode 114 grounded and its plate 116 connected to the terminal 112 through an electromagnet coil 118 and a cam operated contact 119. The grid 117 of the tube 113 is connected between the resistors 109 and 110. The resistor 109 is shunted by a capacitor 121.

The tube voltages are so regulated that the pentode 101 is normally conducting but, when coincident negative pulses are received at terminals 76 and 78 of the associated AND circuit 80, the terminal 79 becomes negative thereby biasing the grid 106 and cutting off the tube 101. When the plate current is cut off, the sudden collapse of current in the coil 103 causes a high induced voltage that raises the potential of the trigger electrode 29 thereby causing a breakdown of the air gap between the electrodes 27 and 29. A capacitor 122 is connected across the electrodes 27 and 28 and is charged to a high potential from a high potential supply 123, through a cam operated contact 124 and a resistor 125. The triggering arc breaks down the dielectric barrier between the principal electrodes 27 and 28 sufficiently for the high potential of the capacitor 122 to jump the gap between electrodes 27 and 28 resulting in a brilliant flash as the capacitor 122 discharges.

When the pentode 101 is cut off, the current in the screen grid 107 also is cut off causing the grid of the thyratron 113 to swing more positive thereby causing the tube 113 to fire and energize the magnet 118. The function of the magnet 118 will be pointed out hereinafter.

*Zoning circuit*

Figure 11:
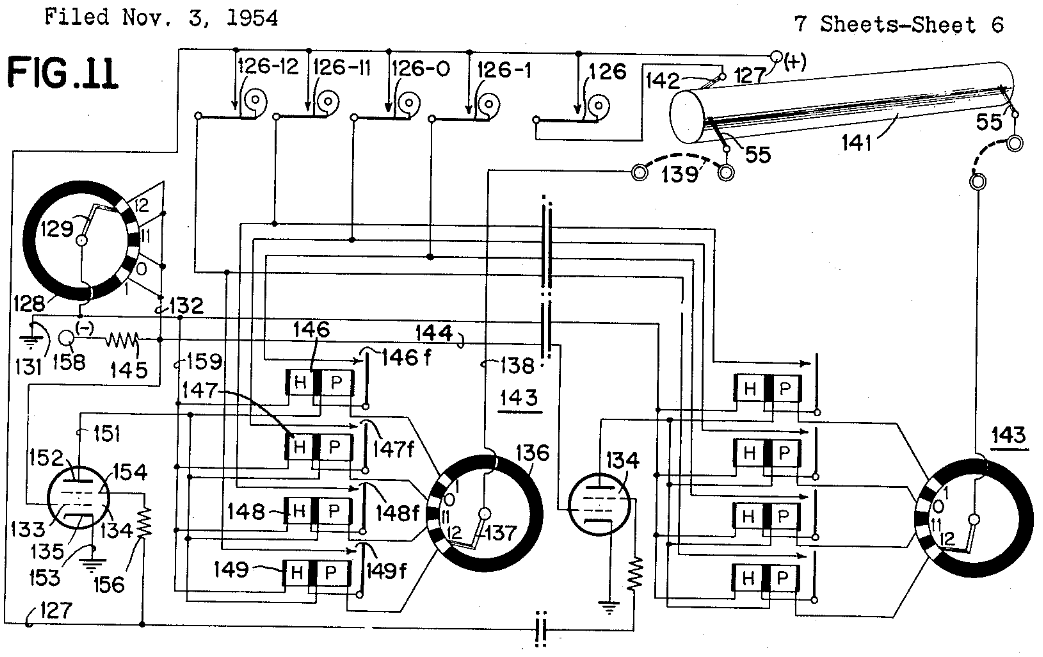
Fig. 11 is a schematic showing of two zoning circuits.

Referring to Fig. 11, five cam operated contacts 126, 126—1, 126—0, 126—11 and 126—12 are shown connected to a positive potential supply 127. These cams, as well as all other cams and emitters to be referred to hereinafter, are fixed on a common cam shaft (not shown) that is adapted for one revolution per card cycle. The cams are timed to operate their respective contacts as follows:

| Contact | Close, degrees | Open During Following Cycle, degrees |
|---|---|---|
| 126 | 351 | 99 |
| 126—1 | 351 | 292.5 |
| 126—0 | 13.5 | 315 |
| 126—11 | 36 | 337.5 |
| 126—12 | 58.5 | 360 |

Figure 13:
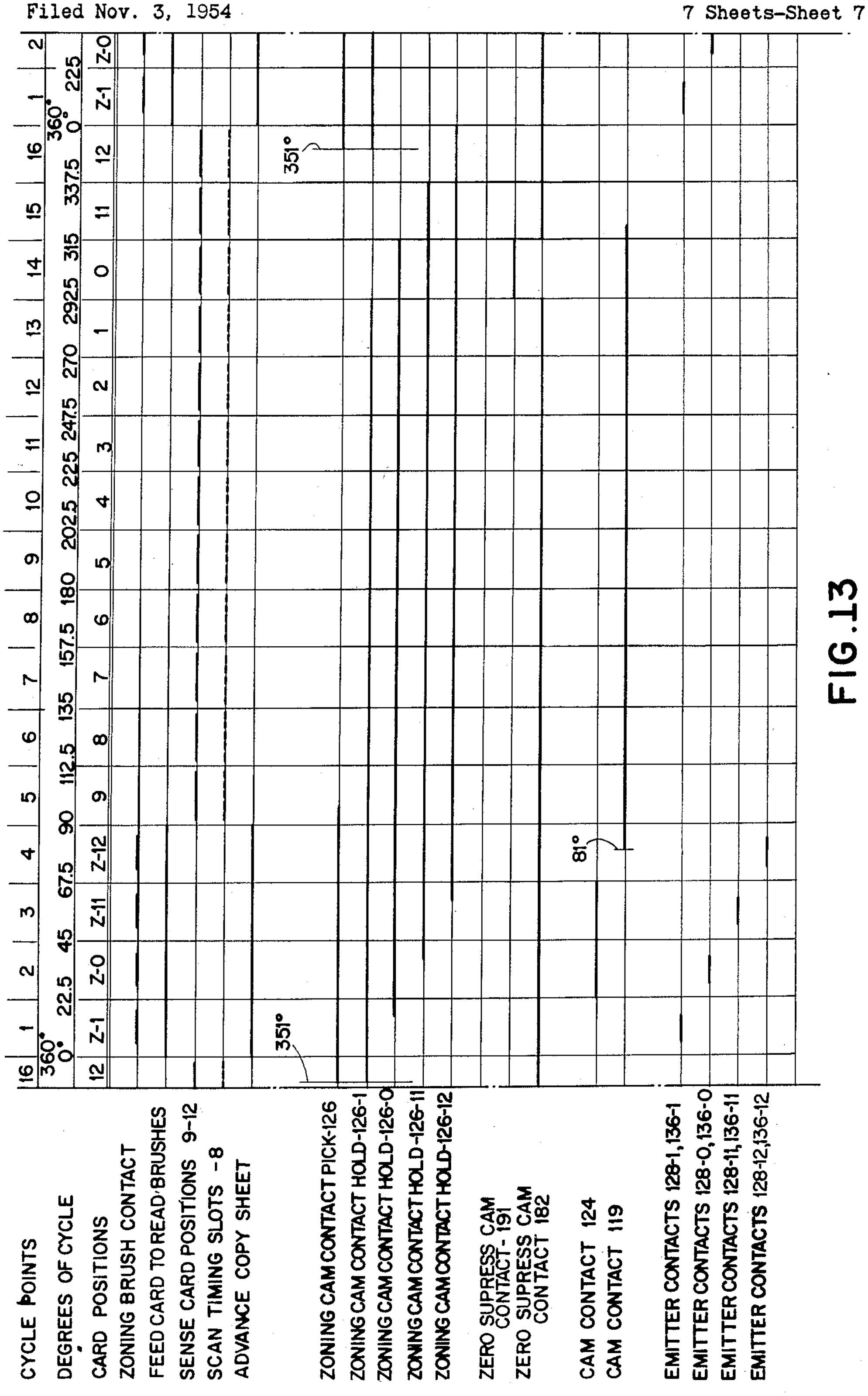
Fig. 13 is a timing chart showing the sequence of operations of the various contacts.

See the Timing chart, Fig. 13.

An emitter 128 having a wiper 129 grounded at 131 is affixed to the previously mentioned cam shaft for rotation therewith. The emitter 128 has four wiper contacts 128—1, 128—0, 128—11 and 128—12 that are connected in parallel to a common line 132 that in turn is connected to a grid 133 of a tube 134. The wiper 129 is timed to sweep the wiper contacts 128—1, 128—0, 128—11 and 128—12 simultaneously with the sensing of the respective positions 1, 0, 11 and 12 of the card A by the zoning brushes 55 for conditioning the grid 133 of the tube 134.

A similar emitter 136 having a wiper 137 is similarly operated for sensing wiper contacts 136—1, 136—0, 136—11 and 136—12 simultaneously with the sensing of the corresponding wiper contacts 128—1, 128—0, 128—11 and 128—12. The wiper 137 is connected to a line 138 which is pluggable selectively to any one of the zoning brushes 55 by a plug wire 139. A card that is fed under the zoning brushes 55 is sensed thereby and, when a punched hole passes under a zoning brush, contact is made to a conductive roller 141, and through a commutator brush 142 to the cam operated contact 126 and then to the positive potential terminal 127. As described herein, only 30 zoning units are provided although any number up to eighty could be provided. Two such units are shown in Fig. 11 and are generally designated 143. Each unit 143 has an individual tube 134 and emitter 136, whereas a single emitter 128 serves to condition the grids 133 of all tubes 134 through parallel connections to a line 144 that is connected to the line 132, and through a resistor 145 to a negative potential terminal 158.

The wiper contacts 136—1, 136—0, 136—11 and 136—12 are connected to individual relay coils 146, 147, 148 and 149 that are connected to a common line 151 that in turn is connected to a plate 152 of the tube 134. The cathode 135 of the tube 134 is grounded at 153. The screen grid 154 of each tube 134 is connected through a resistor 156 to the positive terminal 127.

Normally, each tube 134 is held in a non-conducting state by the negative bias from the terminal 158 to the grid 133 and by an open contact 136—1, 136—0, 136—11 or 136—12 in the plate circuit. When the zoning brushes 55 sense the zone holes, several things happen simultaneously. The wipers 129 and 137 sweep their respective contacts 128—1 through 128—12 and 136—1 through 136—12 while the zoning brushes 55 sense the holes 1, 0, 11 and 12 in the card in that order. At the time that the brushes 55 are, for example, sensing the "12" zone holes, the contacts 126 and 126—12 are closed. The grids 133 of the tubes 134 are raised to ground potential by a circuit from ground at 131, through the wiper 129, through the wiper contact 128—12 and the line 132 to the grids 133. The plate circuit for a particular tube 134 will be complete from the terminal 127, through the contact 126, the common brush 142, the roller 141, a zoning brush 55 and a plug wire 139 to the wiper 137, through the wiper contact 136—12, a relay coil 149P, the line 151, the plate 152 of the tube 134 and the cathode 135 to ground at 153. The relay 149 is thereby picked closing a series of points 149-*a* through 149-*f*, and a hold circuit is established from the terminal 127, through the contact 126—12, a normally open, now closed, relay point **149*f*, a hold coil 149H of the relay 149, and a line 159 to ground at 131. Similarly, parallel circuits to the plate of the tube 134 are associated with the wiper contacts 136—1, 136—0 and 136—11, and hold circuits are provided in the described manner for similar relays 146, 147 and 148 through the cam contacts 126—1, 126—0 and 126—11** respectively.

Switching arrangements under control of the relays 146, 147, 148 and 149 are shown in Fig. 10 where they are generally designated 161. The relay points **146*a*, 147*a*, 148*a*, and 149*a* are normally open while the remaining relay points 146*b*, 147*b*** and *c*, **148*b***, *c* and *d*, **149*b***, *c*, *d* and *e* are normally closed. Five input lines 162, 163, 164, 165 and 166 enter the unit 161 from the right, whereas a single output line 167 emerges from the unit 161 at the left. Tracing these circuits reveals that normally only the circuit from the line 162 is complete through the contacts **146*b*, 147*c*, 148*d* and 149*e* to the line 167. When the relay 146 is operated, the point 146*a* closes and the point 146*b* opens whereby the circuit 163 is completed through the relay points 147*b*, 148*c*, 149*d* and 146*a* to the line 167, while the circuit 162 is interrupted at the point 146*b*. Operation of the relay 147 completes the circuit 164 through the relay points 148*b*, 149*c* and 147*a* while interrupting the circuits 162 and 163 at points 147*b* and 147*c*. Operation of the relay 148 completes the circuit 165 through the relay points 149*b* and 148*a* while interrupting the circuits 162, 163, and 164 at points 148*b*, 148*c* and 148*d*. Operation of the relay 149 completes the circuit 166 through the relay 149*a* while interrupting the circuits 162, 163, 164 and 165 at 149*b*, 149*c*, 149*d* and 149*e***.

As previously described, hold circuits to the relays 146, 147, 148 and 149 are established through the respective relay points **146*f*, 147*f*, 148*f* and 149*f*. The hold circuits so completed will hold until the associated cam contacts 126—1, 126—0, 126—11 and 126—12 are opened after printing and before zoning for the next cycle as indicated in the timing chart, Fig. 13. It will be noted in Fig. 7 that in some instances the code representation comprises two zone holes; for example, in the case of the division symbol (÷), the code is a 12 hole and an 11 hole. It therefore becomes apparent that two zoning relays, in this case 148 and 149 will be picked and held in a single card cycle. This presents no difficulty since, as described, the relay units 161** are effective to interrupt any previously completed circuits when a subsequent zone hole is sensed.

Referring again to Fig. 10, the wiring diagram includes two zoning relay units 161, two AND units 80, two arc units 6, and five amplifiers 99, all of which have been described hereinbefore. The amplifiers are designated 99N, 99—1, 99—0, 99—11 and 99—12 to correspond to NO-zone, 1-zone, 0-zone, 11-zone and 12-zone. Also represented in Fig. 10 are two of the reading brushes 56 and the five photo conductive cells 11 which are acted upon by rays from the light sources 9 passing through the timing slots 8.

As a slot 8 is moved past its respective light source 9, the corresponding photo conductive cell 11 is exposed thereby causing a lowering of the cell resistance and supplying an input pulse to the terminal 98 of the respective amplifier 99. This input pulse causes an output pulse to the corresponding line 162, 163, 164, 165 or 166. Each time a group of five slots 8 passes the light sources 9 and the photo conductive cells 11, pulses will be emitted from each amplifier to the associated line 162, 163, 164, 165 or 166. A pulse from one line only, depending on the zoning, will find a path through a given unit 161, to the associated line 167. If a zone hole is not sensed by a zoning brush 55, the pulse will be from the amplifier 99–N to the line 162. If one zone hole is sensed for a particular column, the pulse will be to the line associated with that particular zone. If two zone holes are sensed, the pulse will be to the line associated with the last-sensed zoning hole. For alphabetic or combined alphabetic and numeric printing, a jumper wire 171 is plugged from a hub 172 that is connected to the wire 167 to a hub 173 that is associated with a particular AND unit 80. A pulse from the line 167 goes through the associated hub 172 and jumper 171 to a selected hub 173 and through a line 174 to the terminal 76 of an AND unit 80. If a character represented by one slot 8 of the group of five slots is to be printed, a hole in a card A will be sensed simultaneously by a brush 56 and a pulse lasting for the duration of the associated group of five pulses will reach the terminal 78 at the same AND circuit 80 as follows: from the negative terminal 111, through a commutator brush 177, through a conducting roller 178, through a brush 56, or brushes if the same character is to be printed in more than one print position, through a line 179 to the terminal 78.

The coincidence of pulses at the terminals 76 and 78 results, as described, in a potential at terminal 79 that is sufficiently negative to cut off the tube 101 as described in the arcing circuit description. The high induced voltage from the coil 103, caused by cutting off the tube 101, triggers the arc unit 6, as described, effecting projection of the selected character through the associated lens 7 onto the photo emissive plate 13. The capacitor 122 associated with the triggered arc is discharged by the arcing and is not recharged until after the print cycle is completed. Since the capacitor is now discharged, a second coincidence of pulses at the terminals 76 and 78 could not result in the projection of a second character. In the described manner, all of the card positions are sensed synchronously with the rotation of the characters 2 past their respective arc units and the associated slots 8 past their respective light sources until a complete set of characters has passed the exposure line and the selected ones have been exposed.

While the next following card is zoned and advanced to the sensing station, the cam contact 124 is closed and all of the discharged capacitors 122 are recharged from the high potential supply terminal 123 in preparation for the next print cycle.

It will be noted that the use of the plug wire 171 makes it possible to provide a lesser number of zoning units 161 and to plug the zoning units to any desired arc units 6 and makes it unnecessary to build such zoning units into every column of the printer.

*Numeric printing*

In columns where only numeric printing occurs, zoning units are not required since zone holes do not comprise a part of the numeric code designations. In numeric printing, only the "N" timing track, Fig. 6, and the amplifier 99–N are effective. Referring to Fig. 10, a line 181 is connected to the line 162 ahead of the zoning relays 161 and serves for numeric printing. The circuit is from the line 162 through the line 181, through a normally closed cam contact 182 to a line 183 having 80 hubs 184, two of which are shown. For numeric printing in a particular column, a jumper wire 186 is plugged between hubs 184 and 173 in place of the jumper wire 171. The coincidence of pulses at the AND unit 80, as in the case described hereinbefore effects printing of selected digits. Also, as described hereinbefore, numeric printing may be accomplished through the zoning relay units 161 since, in the normal condition of the relay units 161, the only complete circuit is from the amplifier 99–N, through the line 162, through relay points **146*b*, 147*c*, 148*d*, and 149*e* to the line 167. The circuit by-passing the units 161 makes possible the elimination of the units 161** associated with print columns in which alphabetic data is never to be printed.

*Zero suppression*

Figure 12:
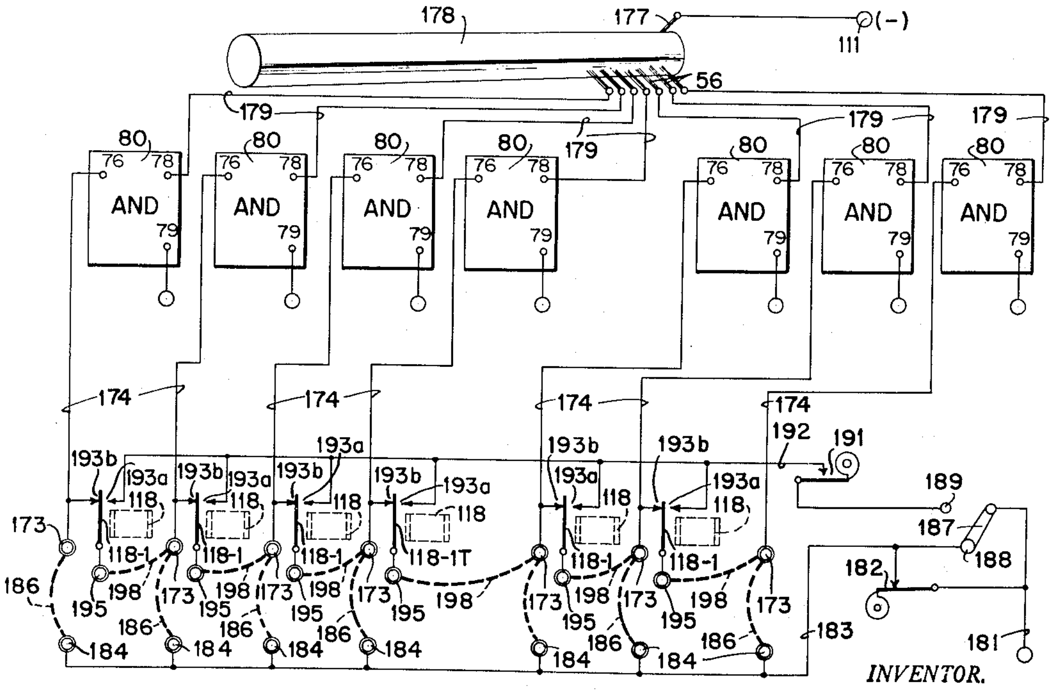
Fig. 12 is a schematic showing of the zero suppression circuitry.

Frequently the punched card record will have zeros punched to the left of a significant digit which are not desired on the printed record. In order that such zero printing may be suppressed, relays and cam contacts have been added to the previously described circuit. Referring to Figure 12, seven column units are partially shown whereas in Fig. 10 only two units are shown. The partial circuit of Fig. 12 may be oriented with respect to the circuit of Fig. 10 by reference to the AND units 80, the hubs 184 and the line 181.

The cam contact 182, as described, is normally closed and thereby effects numeric printing but, after the "1" print time and prior to the "0" print time, as indicated in Fig. 13, the cam contact 182 opens thereby preventing zero printing in the usual manner. If zero suppression is not desired, a manual switch 187 is moved to contact a blade 188 causing the normally closed, now open, cam contact 182 to be by-passed thereby allowing zero printing to occur. If, however, zero suppression is desired, the manual switch 187 is moved to contact a blade 189 that connects the line 181 to a cam contact 191 that is normally open but closes at zero print time simultaneously with the opening of the cam contact 182. The other side of the cam contact 191 is connected to a line 192 that in turn is connected to eighty fixed contact blades **193*a*. Each blade 193*a* has associated therewith a second fixed contact blade 193*b* that is connected to one of the lines 174 that lead to the AND circuit terminals 76. Eighty movable contact blades 118—1 that normally contact the blades 193*b* are the armatures of the previously referred to magnets 118 that are energized by the firing of the thyratrons 113 and are connected to associated hubs 195. When a magnet 118 is energized by the cutting off of the corresponding tube 101 and the resultant firing of the associated thyratron 113, as previously described, the movable armature 118—1 transfers to the fixed blade 193*a*. The contact 118—1 of each column unit is plugged to the hub 173 of the column to the right by means of a jumper wire 198. Assume, for example, that the seven columns of the card corresponding to the seven units in Fig. 12 are punched as follows: 0001000, and assume further, that zero suppression is not desired. At "1" print time, the column having the "1" will be exposed. At zero time the AND circuit terminals 78 for the remaining six columns will receive negative pulses through the lines 179 from the brush sensing of the zero codes in the card A. Coincidentally therewith, a negative pulse will enter the line 181 from the line 162 bypassing the now open cam contact 182 through the switch blades 187 and 188, thereby pulsing all hubs 184 and, through the jumpers 186, also pulsing the terminals 76 of all of the AND units 80 that are plugged to hubs 184. The six arc units required for printing the zeros will be triggered thereby exposing the zeros. The column having the "1" already exposed will not be affected although the corresponding hub 184 is pulsed since a "1" code is not simultaneously sensed in the card A and furthermore since the corresponding capacitor 122** has already been discharged in exposing the "1."

Assume now that printing of the zeros to the left of the "1" are to be suppressed whereas the zeros to the right of the "1" are to be printed. The switch blade 187 is moved to the contact 189. At zero time the pulse from the line 181 goes through the switch blades 187 and 189, through the normally open, now closed, cam contact 191 to the line 192 and to all of the fixed blades **193*a*. All of the seven magnet armatures 118—1 are still in normal position to the left except the middle one additionally designated 118–1T that transferred to the fixed blade 193*a* at "1" print time when the corresponding tube 101 was cut off and the thyratron 113 fired energizing the associated magnet 118. All circuits from the line 192 through the blades 193*a* to the armature contacts 118—1 are open except in the case of the armature contact 118–1T through which a circuit is now complete from the line 192, through the blade 193*a*, through the armature 118–1T and the jumper 198 to the hub 173 and line 174 to the right. Simultaneously the pulse reaches all lines 174 to the right through the relay blades 193*b*, the armature contacts 118—1 and the jumpers 198 thereby affecting zero printing in all positions to the right of the significant digit "1." After the zero printing occurs in any one of the columns to the right of the armature 118–1T, the associated armature 118—1 will transfer to the contact blade 193*a*, but by that time the zero printing will also have occurred in the other print positions to the right thereof and the opening of the contacts 193*b*** will have no effect.

It will be noted that this single pulse through the armature contact 118–1T that effects zero printing to the right will be halted at any point where another significant digit has been printed, but that a new pulse will start at the point of this latter significant digit and effect zero printing to the right thereof. Zero printing to the right of any point may be eliminated by the removal of the proper jumper wire 198.

*Summary*

Referring to Fig. 13, the timing chart illustrates the timing of the various contacts during the sixteen point card cycle. Starting at the left of the timing chart, a portion of the cycle point "16" of the previous card cycle is shown during which exposure of characters coded in the previous card A is completed. During cycle point "16," the zoning cam contact 126 closes to complete the zoning relay pick circuit to the emitter wipers 137. Also the zoning cam contact 126—1 makes for the 1-zone hold circuits. During the printing of data from the previous card A, the following card was advanced under the zoning brushes from the card position 57—9 to the position 57—2 thereby placing the "1" zone adjacent the zone brushes 55. During the first four cycle points of the next card cycle, the zone portion of the card is fed under the zoning brushes 55 and toward the reading brushes 56. During the first cycle point the contacts 128—1 and 136—1 are closed and the 1-zones of all 80 columns are sensed and zoning circuits are set up through the contacts 126—1, 128—1 and 136—1 in all columns having the "1" code punched therein. Also during cycle point 1, the zoning cam contact 126—0 makes for holding any 0-zone circuits that may be set up during cycle point 2. During cycle point 2, the contacts 128—0 and 136—0 close and circuits are set up through the contacts 126—0, 128—0 and 136—0 for all columns having a "0" code punched therein. Also, during cycle point 2 and continuing through cycle point 3, the cam contact 124 closes for charging the arc unit capacitors 122. The zoning cam contact 126—11 closes for holding "11"-zone circuits that may be set up during cycle points 3. During cycle point 3, the contacts 128—11 and 136—11 close and circuits are set up for all columns having an "11" code punched therein and the zoning cam contact 126—12 makes for holding "12"-zone circuits that may be set up during cycle point 4. During cycle point 4, the contacts 128—12 and 136—12 close and "12"-zoning is accomplished, through contacts 126—12, 128—12, 136—12, the contact 124 opens, and the cam contact 119 closes connecting the plates of the thyratrons 113 to the positive terminal 112.

During cycle point 5, the zoning cam contact 126 opens since the zoning operation is then complete. Sensing of the card punch positions by the reading brushes 56 and scanning of the corresponding slots in the timing tracks by the lights 9 occur during cycle points 5 through 16 with appropriate arc units being discharged as selected characters pass. As soon as each zoning hold circuit is no longer needed, the respective cam contacts 126—1, 126—0, 126—11 and 126—12 open so as to restore the relay units 161 to normal in preparation for the next zoning cycle. The contact 126—1 opens at 292.5° just after the sensing of the "1" punch position by the reading brushes 56; the contact 126—0 opens at 315° just after the sensing of the "0" position; the contact 126—11 opens at 337.5° just after the sensing of the "11" position; and contact 126—12 opens at 360° just after the sensing of the "12" position. The above procedure is immediately repeated for the next succeeding card, as indicated in Fig. 13, during the next card cycle that commences at 360°.

While there have been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. In a photo recorder including a continuously rotating member having a plurality of transparent characters arranged in columns and corresponding characters in said columns being aligned laterally, the combination of: a photo sensitive medium positioned adjacent one surface of said member; a plurality of illuminating means positioned adjacent the other surface of said member for projecting images of said characters; means for firing said illuminating means at differential times during the transit of each of said columns of characters past said illuminating means; a plurality of lenses for focusing said projected images on said photo sensitive medium; and means for deveoping said images.

2. In a line-by-line photo recorder including a continuously rotating drum having a plurality of transparent characters arranged in columns with corresponding characters in said columns being aligned laterally, the combination of: a photo sensitive medium positioned adjacent one surface of said drum; a plurality of arc units positioned adjacent the other surface of said drum for projecting images of said characters; means for triggering said arc units at selected differential times during the transit of said columns of characters past said arc units; a plurality of lenses interposed between said drum and said photosensitive medium for focusing said projected images on said photo sensitive medium; and means for developing said projected images.

3. A photo recorder according to claim 2, wherein said photo sensitive means and said means for developing said images comprises a photo emissive member for emitting electrons; a charged member for attracting said emitted electrons; a record sheet interposed between said photo emissive and said charged members for receiving said electrons whereby latent images of said projected characters are formed thereon; powdering means for developing said latent images.

4. A photo recorder according to claim 3 including means for presenting a new area of said record sheet after a complete set of said characters have passed said arc units.

5. In a photo recorder including a continuously moving member having a plurality of adjacent columns of characters, the characters in said columns being arranged in sets and corresponding characters in adjacent sets being aligned in rows, and a plurality of columns of slots adjacent one end of said row of characters, one of said slots being aligned with each of said rows of characters, the combination of: a photo sensitive medium positioned adjacent one surface of said member opposite said sets of characters; a plurality of illumination sources positioned adjacent the other surface of said member for projecting images of selected ones of said characters onto said photo sensitive medium; light sources positioned adjacent said one surface of said member opposite said columns of slots; a plurality of light responsive control means positioned adjacent said other surface of said member opposite said columns of slots; means responsive to intermittent illumination of said control means, through said slots for emitting first timing pulses; record sensing means for producing second timing pulses in timed relation with said first timing pulses; means responsive to coincident reception of said first and said second timing pulses for actuating said illumination sources not more than once at selected differential times during the transit of said sets of characters past said illumination sources; individual means associated with each of said columns of characters for focusing said projected images on said photo sensitive medium, and means for developing said images.

6. In a cyclically operable device for selectively triggering a plurality of space discharge units at differential times during a cycle of operation, in combination, means for deriving first differentially timed pulses from a record source; a rotating member having a plurality of columns of trans-illuminable areas arranged in sets; illumination means positioned adjacent one surface of said member; photo sensitive means associated with each of said columns of trans-illuminable areas and arranged as an index line adjacent the other surface of said member; means for moving said member past said index line in timed relation with the derivation of said first pulses; means associated with each of said photo sensitive means for emitting second timed pulses in response to the illumination of said photo sensitive means through said trans-illuminable areas; a plurality of space discharge units; a plurality of means responsive to coincident reception of said first and said second timed pulses for actuating associated ones of said space discharge units not more than once at differential times during a cycle of operation comprising the movement of one of said sets of trans-illuminable areas past said index line.

7. In a machine for selectively projecting a plurality of characters onto a photo sensitive medium, the combination of: a constantly rotated character-carrying member; a plurality of arc units positioned adjacent one surface of said member; a plurality of means responsive to the reception of first and second coincident pulses for triggering said arc units; a photo sensitive medium positioned adjacent the other surface of said member; means for producing a plurality of said first pulses in timed relation with the transit of said characters past said arc units; means for delivering selected ones of said first pulses to selected ones of said responsive means in timed relation with the transit of selected characters past said arc units; means for producing said second pulses at differentially selected times; means for delivering said second pulses to said selected responsive means in coincidence with the reception of said first selected pulses and the transit of said selected characters past said arc units, whereby selected ones of said arc units are fired and images of said selected characters are projected onto said photo sensitive medium.

8. The invention set forth in claim 7 having selectively connectible means for connecting any one of said first pulse delivering means with any one of said responsive means for triggering said arc units.

9. In a device for selectively triggering a plurality of arc units in timed relation with the transit of selected trans-illuminable characters past said arc units for trans-illuminating said selected characters, the combination of: a plurality of said arc units; means responsive to first and second coincident pulses for triggering said arc units; a plurality of sets of characters; means for moving said sets of characters past said arc units; a plurality of groups of selectively operable circuit makers that are operable in response to differentially timed pulses for completing selected ones of a plurality of groups of circuits; means for producing said differentially timed pulses; means for producing and delivering said first pulses through said completed circuits to associated ones of said responsive means in timed relation with the transit of selected ones of said characters past said arc units; means for selectively producing and delivering said second pulses to said selected responsive means in coincidence with said first pulses, whereby said selected arc units are triggered and said selected characters are trans-illuminated.

10. The invention set forth in claim 9 having means for connecting any one of said groups of circuits selectively with any one of said plurality of responsive means for triggering said arc units.

11. In a device for selectively trans-illuminating a plurality of characters, the combination of: first and second record analyzing stations; a constantly rotated drum carrying a plurality of adjacent columns of characters and a plurality of columns of slots; a plurality of arc units and a plurality of constantly glowing light sources positioned adjacent one surface of said drum respectively opposite said characters and said slots; a plurality of photo conductive cells positioned adjacent the other surface of said drum in aligned relation with said light sources and said slots; means responsive to first and second coincident pulses for triggering said arc units as selected ones of said characters pass said arc units; a plurality of circuits associated with said photo conductive cells and said arc triggering means; a plurality of groups of other circuits associated with said plurality of circuits; a plurality of relays associated with said other circuits; means responsive to the sensing of data at said first analyzing station for operating said relays selectively for completing selected ones of said other circuits to said associated arc triggering means and for interrupting any previously completed ones of said other circuits; means for deriving said first triggering pulses each time said photo cells are exposed to said aligned light sources through said slots; means responsive to the sensing of data at said second analyzing station for producing said second coincident triggering pulse.

12. The invention set forth in claim 11 having plug wire connections for selectively connecting any one of said groups of other circuits with any one of said responsive means for triggering said arc units.

13. In a device for selectively projecting a plurality of digital characters onto a photo sensitive medium the combination of a constantly rotated character-carrying member, a plurality of arc units positioned adjacent one surface of said member; a plurality of means responsive to the reception of first and second coincident pulses for triggering said arc units; a photo sensitive medium positioned adjacent the other surface of said member; means for producing said first pulses in timed relation with the transit of said characters past said arc units; means common to groups of said responsive means forming numeric fields for delivering said first pulses thereto; means for producing and delivering said second pulses to selected ones of said responsive means at differentially selected times in timed relation with the reception of said first pulses and the passage of selected digital characters past said arc units whereby images of said selected digital characters are projected onto said photo sensitive medium.

14. In a device for selectively projecting a plurality of digital characters onto a photo sensitive medium according to claim 10, means common to groups of said responsive means forming numeric fields for delivering said first pulses thereto; means selectively operable for disabling said common means at a time when the digital characters zero pass said arc units for suppressing the projection of images of said zeros; other means operable by said disabling means for delivering said first pulses to said responsive means in said numeric field that are positioned to the right of any of said responsive means that have responded to said first and second coincident pulses and for suppressing the delivery of said first pulses to said responsive means that are positioned to the left of said responded means.

References Cited in the file of this patent

UNITED STATES PATENTS

| | | |
|---|---|---|
| 2,221,776 | Carlson | Nov. 19, 1940 |
| 2,409,454 | Thomas | Oct. 15, 1946 |
| 2,605,335 | Greenwood | July 29, 1952 |
| 2,697,891 | Piazza | Dec. 28, 1954 |